Dec. 7, 1926.                                            1,610,076
                     F. W. DE JAHN
METHOD OF PRODUCING NITROGEN HYDROGEN MIXTURE FOR THE SYNTHETIC
                   PRODUCTION OF AMMONIA
                    Filed Sept. 21, 1923
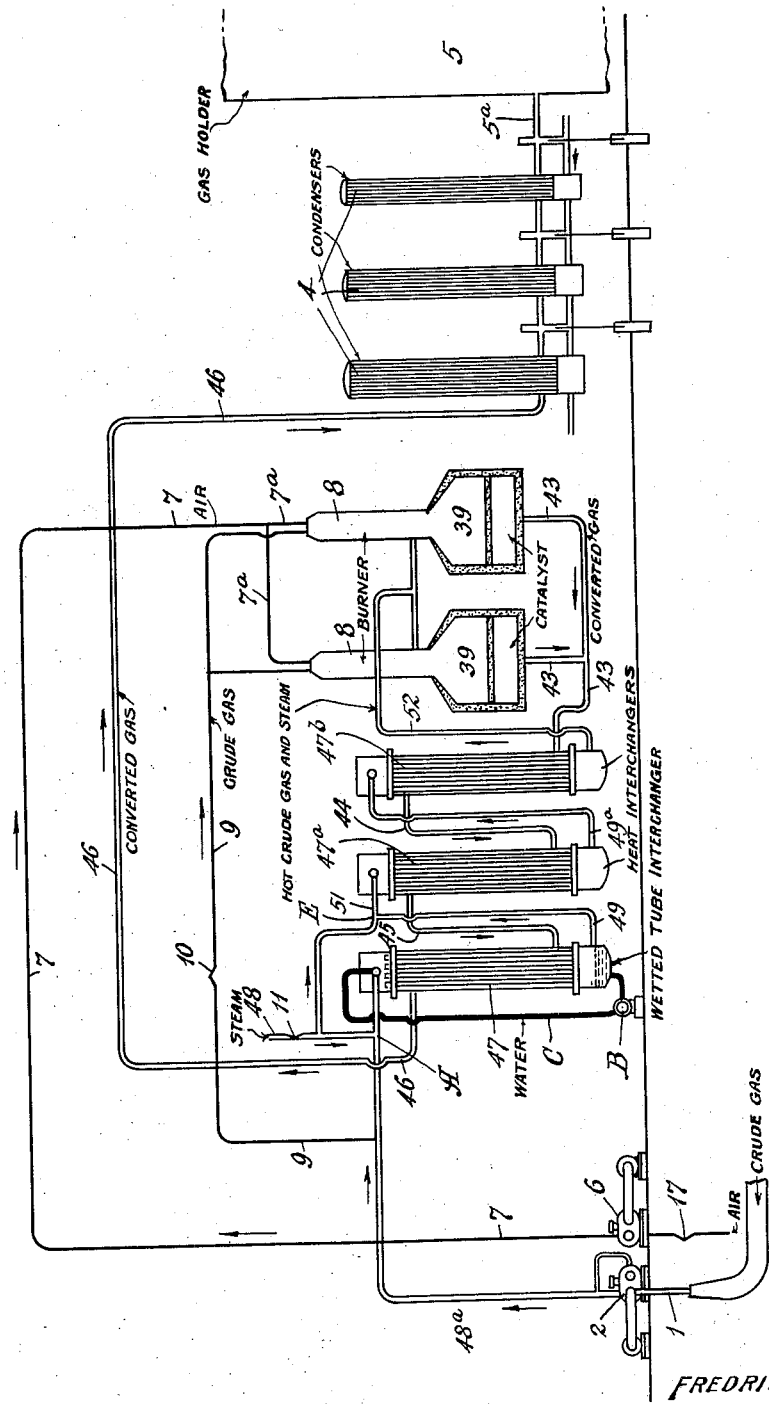
INVENTOR.
FREDRIK W. DE JAHN
BY
ATTORNEYS Patented Dec. 7, 1926.

1,610,076

UNITED STATES PATENT OFFICE.

FREDRIK W. DE JAHN, OF NEW YORK, N. Y., ASSIGNOR TO ATMOSPHERIC NITROGEN CORPORATION, OF SOLVAY, NEW YORK, A CORPORATION OF NEW YORK.

METHOD OF PRODUCING NITROGEN-HYDROGEN MIXTURE FOR THE SYNTHETIC PRODUCTION OF AMMONIA.

Application filed September 21, 1923. Serial No. 663,961.

The invention relates to the process of producing a gas mixture suitable for use, when compressed and purified under said pressure, as catalysis gas for making $NH_3$.

In my application, Serial No. 200,047 filed November 3, 1917, I have described a method of producing such gas which consists in adopting a suitable system of regulation at the gas house to produce a gas mixture containing for each volume of nitrogen, approximately three volumes of hydrogen and carbon monoxide taken together and then by catalysis in the presence of steam causing the CO to be oxidized to $CO_2$ with the production of an equal volume of hydrogen. Inasmuch, however, as the process described in said specification called for the use of a heating flame when the temperature in the vicinity of CO catalyst tended to become too low and said flame introduced into the gases, just prior to the catalysis of CO and steam, an additional quantity of nitrogen, the gas house regulation necessarily required at such times a corresponding deviation such as to cause the production of a gas in which there was intentionally a deficiency of nitrogen corresponding to the additional nitrogen so introduced. In this way the desired 3 : 1 gas mixture was continuously obtained even during those periods when the auxiliary burner was being operated.

Although the fundamental principle of this part of my former invention remains the same, i. e., that the gas mixture to be catalyzed should contain for each volume of nitrogen approximately three volumes of hydrogen and carbon monoxide taken together nevertheless, I have subsequently found that it is by far the better practice not to use the auxiliary burner intermittently and as the means of temperature regulation but to use it continuously for the purpose of fine and final adjustment of the nitrogen ratio in accordance with which it is operated practically continuously and at the same time, the gas house operation is so conducted that generally speaking the composition of the gas mixture always approaches that of a 3 : 1 mixture but is continuously, uniformly and intentionally maintained a little low in nitrogen.

While it may be possible to so regulate the operation of the gas producer as to produce directly and continuously a gas of the required 1:3 ratio, this is in practice a difficult operation. Operating conditions such as variations in the depth and temperature of the fuel bed in the gas producer and the quality of the fuel—which conditions of necessity vary in operation—affect the ratio in the resultant gas even when the air—steam ratio is maintained constant. The gas composition also varies during the period of each individual run. It might seem that while such variations do exist they could be treated as incidental and that the average composition for a reasonable period of time would be substantially constant. It is found, however, that the fresh gas entering the gas holder from the gas producer does not so mix with the gas in the holder that the gas passing out of the holder to the CO converter system will be a gas of the average composition but on the contrary the gas at times tends to stratify in the gas holder the composition of each stratum corresponding to the gas entering the holder and therefore produced during any given period. The fluctuations in the composition of the gas from the producer, some of which as above are unavoidable, are consequently in part and under certain circumstances transmitted directly to the CO system and thereby in turn to the synthesis system.

For these reasons it is preferred not to rely upon the gas house to produce a perfect ratio in the gas.

It is usual to maintain a reserve gas supply (gas holder) between the gas house and the CO oxidation system so that a constant and regulatable flow of gas can be supplied to the latter independent of the existing flow from the gas house and the variations in that flow including those times when the gas house is not operating. Even assuming then that it was possible to obtain a gas of the desired composition directly from the gas house such means of regulation is not available when the gas house is not operating, and even when available, because of the intervening storage vessel, the effect thereof is not immediately and directly transmitted to the ammonia synthesis system.

By my new process these difficulties of the old process are overcome. Any deficiency in nitrogen of the crude gas entering the CO oxidation system is easily and accurately compensated by the introduction of products of combustion of regulated volumes of air and of a combustible gas and this means of regulation is always and immediately available; and the so-called auxiliary burner heretofore referred to may be used for this combustion.

The invention is illustrated in the accompanying drawing.

In that drawing it will be assumed that a nitrogen-hydrogen-carbon monoxid gas is made at the gas house by treating incandescent coke with a regulated mixture of air and steam. This air and steam is preferably so regulated that while the nitrogen-carbon monoxid plus hydrogen ratio approaches 1:3, it does not reach this value but is consistently and intentionally maintained below. This crude gas after suitable cooling and purification is stored in a gas holder. The gas from the gas holder enters the carbon monoxid oxidation system through the line 1, whence the blowers 2 propel it through the line 48$^a$ into one end of a preheating system 47, 49, 51, 47$^a$, 49$^a$, 47$^b$ and through 52 into the converters 39 (which are illustrated as operating in parallel). The converted gas leaves the converters 39 at 43 and passes back through the heat interchanger system 47$^b$, 44, 47$^a$, 45, 47, finally leaving said system through pipe 46. The pipe 46 conveys the gases to condensers 4 and thence through 5$^a$ to the gas holder 5 and ultimately to the large compressor of the purification and ammonia synthesis system.

The required steam for the catalytic reaction ($CO+H_2O=CO_2+H_2$) may all of it be introduced directly as low pressure steam through pipe 48, entering the incoming gas in 48$^a$ at A, the steam being metered at 11, or the heat of the outgoing converted gas may be used in part to produce in situ a certain amount of the required steam content of the reaction gas mixture. This may be accomplished by operating the first interchanger 47 in the manner invented by Walter H. Kniskern, and described in his application, Serial No. 663,956 of September 21, 1923, i. e., as a so-called wetted tube interchanger in which water is continuously circulated by pump B and pipe C into the top of the interchanger 47 and distributed so that it trickles down over the inside surface of the interchanger tubes and in intimate contact with the gas from 48$^a$. The result is that the water becomes heated by heat interchange with the hot converted gas from 45 and water vapor (steam) is evaporated into the raw gas from the circulated water at this temperature. The excess water is recirculated, the volume of circulated water being maintained constant by addition of fresh water. When the first interchanger 47 is thus used as a wetted tube interchanger no steam is added at A but the balance of the required steam is added at E as low pressure metered steam from 48. The temperature in the converter may be controlled in various ways—by proper design and operation of the heat exchange system and by variation in the steam content of the gas in conjunction with the wetted tube interchanger of W. H. Kniskern.

The deficiency in the nitrogen of the crude gas is accurately and directly adjusted at the auxiliary burner 8. To this end a measured quantity of air supplied by blower 6 is introduced by the burner 8 through lines 7 and 7$^a$ and at the same time a measured quantity of the gas entering the system through 48$^a$ is withdrawn at 9 and introduced into the burner. The quantity of the gas so introduced is at least equal to and preferably somewhat in excess of that required for complete combustion of the air introduced. The gas and air can be conveniently measured by meters 10 and 17 situated in the gas and air lines. In practice the crude gas (the gas in 48$^a$) and also the gas after compression and purification and the gas circulating in the ammonia synthesis system proper are constantly analyzed at short intervals. The air supplied at 8 is then regulated accordingly, the air, of course, being a measure of the nitrogen introduced. Obviously, any combustible gas could be used in the burner 8 which would burn with the oxygen of the introduced air and which would not introduce any objectionable impurities into the gas system. Inasmuch, however, as the crude gas (in 48$^a$) is produced as part of the process and is, therefore, always available and inasmuch as its quality is accordingly known and uniform and its quantitative composition also known, it is convenient to use a part of this gas for reaction with the oxygen of the air introduced at the burner.

The burner 8 is preferably located, as indicated in the drawings, immediately in advance of the catalyst, so that it may also serve as a source of heat for the catalytic reaction. Although this is the preferred point in the system for applying the nitrogen regulation, it is manifestly possible to effect the nitrogen regulation at other parts of the gas circulating system illustrated in the drawings, as for example in the gases on their way to catalysis or after catalysis.

The less of the gas from 48$^a$ burned at 8 the better and more economical will be the operation of the system as a whole and this in turn means that the gas house practice should, in the preferred method of operating, according to my process, continuously strive for a ratio of $3:(1-X)$, in which X is less than one and the smaller X is the better. In other words, the preferred process is not to strive for a perfect ratio 3:1 at the gas house but for an approximate ratio at the gas house, say 3:2/3 with intentional deficiency in nitrogen, followed by a reasonably accurate nitrogen injecting control at the burner 8.

My process then has the following advantages:

1. Immediate, exact and easy means of controlling or adjusting the nitrogen-hydrogen ratio of the gas.

2. A means of control which is always operative and independent of the gas house operation.

3. Air, which is the cheapest source of nitrogen, is used to supply the required nitrogen. It has been proposed to use compressed and liquefied nitrogen for the final adjustment of the nitrogen-hydrogen ratio.

4. Economical. It has been proposed to add all or practically all the nitrogen as air at the auxiliary burner. This involves a large loss of hydrogen—either as hydrogen or carbon monoxide—in the combustion of this air in the auxiliary burner.

5. Source of reserve heat.

The burner will supply a certain amount of heat to the system which, although it may not be essential to successful operation, is available if needed. Further, if for any reason the reaction temperature in the converter should become abnormally low and cannot readily be adjusted in any usual manner, the required heat can at once be supplied by temporarily increasing the supply of air to the burner.

6. The practical result is that two independent means of nitrogen control or adjustment are available.

(a) The gas house operation is available for correction of relatively great deviations from the desired ratio, for preliminary and relatively coarse adjustment and for cases where the adjustment may be made gradually or is not desired immediately.

(b) The auxiliary burner is available for fine, final and immediate adjustment of the ratio.

In practicing the invention of this application it is to be understood that the crude nitrogen-hydrogen-carbon monoxide gas may be produced by any desired method. Such a gas would result, for example, by mixing gas from two producers, one operated to produce "water gas" (mainly CO and H) and the other operated to produce "producer gas" (mainly CO, H and N) or by adding to water gas some of the gas produced during the blast or heating period—"blast gas" (mainly $CO_2$, CO and N), etc. In the case of such a gas made by mixing two separate and different gases the addition of the one to the other can be so regulated as to give the approximate desired ratio, the final ratio regulation being performed by the auxiliary burner or its equivalent.

Numerous modifications may obviously be made without departing from the scope of this invention.

I claim:

1. The process of producing a gas mixture containing nitrogen and hydrogen in a predetermined ratio which consists in preparing a gas mixture of nitrogen, hydrogen and carbon monoxide in which the ratio of nitrogen to hydrogen plus carbon monoxide is less than the desired predetermined ratio of nitrogen to hydrogen treating this gas with steam in the presence of a catalyst whereby CO is oxidized to $CO_2$ with the production of an equal volume of hydrogen and prior to the completion of the catalytic reaction supplying to the gas the deficiency in nitrogen by burning regulated quantities of air in the gaseous system.

2. In the process of producing a nitrogen-hydrogen gas mixture in a predetermined ratio suitable for ammonia synthesis by treating a nitrogen-hydrogen-carbon monoxide gas mixture with steam in the presence of a catalyst adapted to the oxidation of CO to $CO_2$ and the production of an equal volume of hydrogen, that improvement which consists in preparing a crude gas mixture in which the ratio of nitrogen to hydrogen plus carbon monoxide is less than the desired predetermined ratio of nitrogen to hydrogen and subsequently, during the treatment of the gases prior to ammonia synthesis supplying the deficiency in nitrogen by the addition to the gas mixture of the gaseous result from the combustion of air with a portion of the gas in quantities regulated with reference to said deficiency.

3. In the process of producing a nitrogen-hydrogen gas mixture suitable for ammonia synthesis by treating a nitrogen-hydrogen-carbon monoxide gas mixture with steam in the presence of a catalyst that improvement which comprises supplying to the gas any deficiency in nitrogen by adding to said gas prior to the completion of the catalytic reaction the gaseous result from the combustion of air with a combustible gas in quantities regulated with reference to said deficiency.

4. The process of producing a gas mixture intended for ultimate use as catalysis gas for making ammonia, which consists in treating incandescent carbonaceous material with controlled amounts of air and steam to produce a crude mixture in which the hydrogen plus carbon-monoxid content by volume is more than three times the nitrogen content by volume and then supplying to the crude gas the nitrogen required for a gas mixture, after CO conversion, containing hydrogen and nitrogen in the proportion of 1:3 by volume by introducing regulated amounts of air at an auxiliary burner opening into the gas prior to the CO conversion, consuming oxygen of the said air, and treating the gas mixture, as thus modified, for conversion of its CO to $CO_2$ with the production of corresponding volumes of hydrogen.

5. The process of producing a gas mixture intended for ultimate use as catalysis gas for making ammonia, which consists in treating incandescent carbonaceous material with controlled amounts of air and steam to produce a crude mixture in which the hydrogen plus carbon-monoxid content by volume is more than three times the nitrogen content by volume and then supplying to the crude gas the nitrogen required for a gas mixture after CO conversion containing hydrogen and nitrogen in the proportion of 1:3 by volume by introducing regulated amounts of air at an auxiliary burner opening into the gas prior to the CO conversion, consuming oxygen of the said air by combustion with regulated amounts of gas from the same source as the unconverted gas entering the converter, and treating the gas mixture as thus modified for conversion of its CO to $CO_2$ with the production of corresponding volumes of hydrogen.

6. The process of producing a gas mixture intended for ultimate use as catalysis gas for making ammonia, which consists in treating incandescent carbonaceous material with controlled amounts of air and steam to produce a crude mixture in which the hydrogen plus carbon-monoxid content by volume is more than three times the nitrogen content by volume and then supplying to the crude gas the nitrogen required for a gas mixture after CO conversion, containing hydrogen and nitrogen in the proportion of 1:3 by volume by introducing regulated amounts of air at an auxiliary burner opening into the gas prior to the CO conversion, consuming oxygen of the said air and also supplying to said burner regulated amounts of gas from the same source as the unconverted gas entering the converter, treating the gas mixture as thus modified for conversion of its CO to $CO_2$ with the production of corresponding volumes of hydrogen, and maintaining the heat required at the converter by passing the converted gases into heat exchange relation with the incoming unconverted gas and in said heat exchange system correcting temperature deficiencies or excesses observed in the converter.

7. The process of producing a gas mixture intended for ultimate use as catalysis gas for making ammonia, which consists in treating incandescent carbonaceous material with controlled amounts of air and steam to produce a crude mixture in which the hydrogen plus carbon-monoxid content by volume is more than three times the nitrogen content by volume, but in which the ratio of 3:1 is approximated, and then supplying to the crude gas through a regulatable flame the balance of nitrogen content required for the production of a gas mixture containing hydrogen and nitrogen in the proportion of 1:3 by introducing regulated amounts of air at an auxiliary burner opening into the gas prior to the conversion and at the said burner consuming oxygen of the said air and then treating the gas mixture as thus modified, for conversion of its CO to $CO_2$ with the production of corresponding volumes of hydrogen.

8. The process of producing a gas mixture intended for ultimate use as catalysis gas for making ammonia, which consists in treating incandescent carbonaceous material with controlled amounts of air and steam to produce a crude mixture in which the hydrogen plus carbon-monoxid content by volume is more than three times the nitrogen content by volume but in which the ratio of 3:1 is approximated, and then supplying to the crude gas through a regulatable flame the balance of nitrogen content required for the production of a gas mixture containing hydrogen and nitrogen in the proportion of 1:3 by introducing regulated amounts of air at an auxiliary burner opening into the gas prior to the conversion and at the said burner consuming oxygen of the said air and also supplying to said burner regulated amounts of gas from the same source as the unconverted gas entering the converter.

In testimony whereof I have hereunto set my hand.

FREDRIK W. DE JAHN.